C. J. SCHNEIDER, J. SCHNEIDER, J. H. LOEFFLER & C. FLECK.
HOSE CONVEYER.
APPLICATION FILED SEPT. 21, 1911.
1,028,612.
Patented June 4, 1912.
3 SHEETS—SHEET 1.
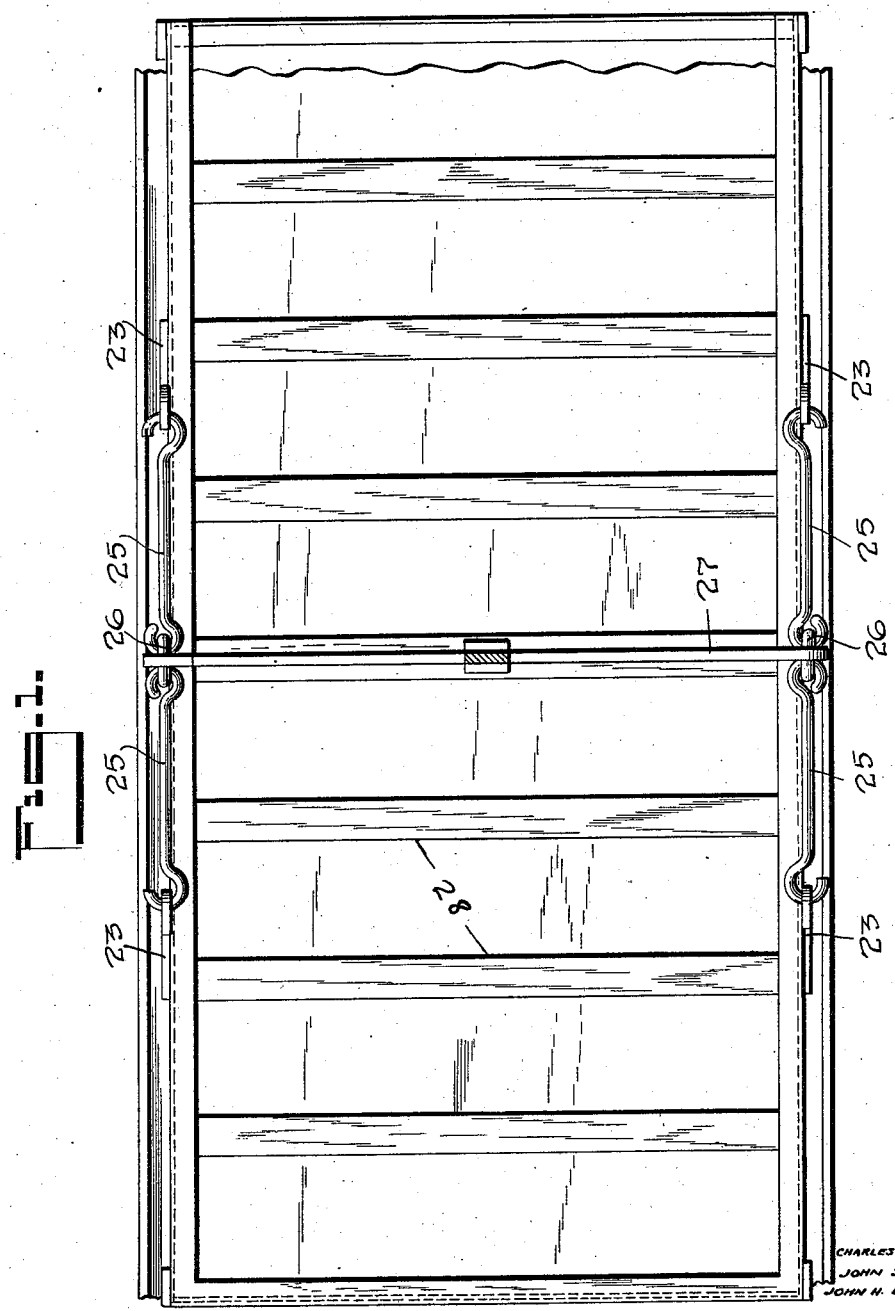

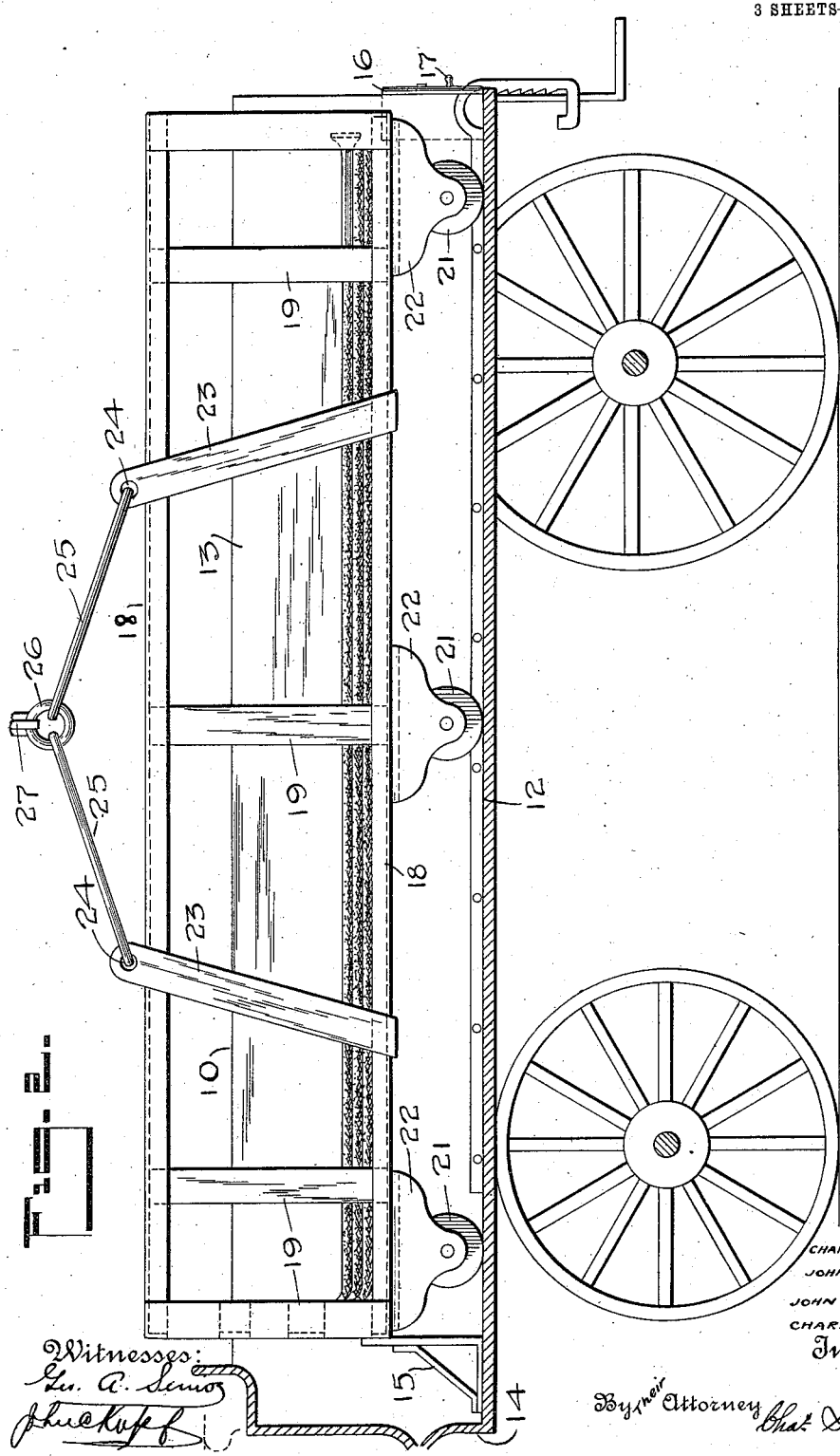

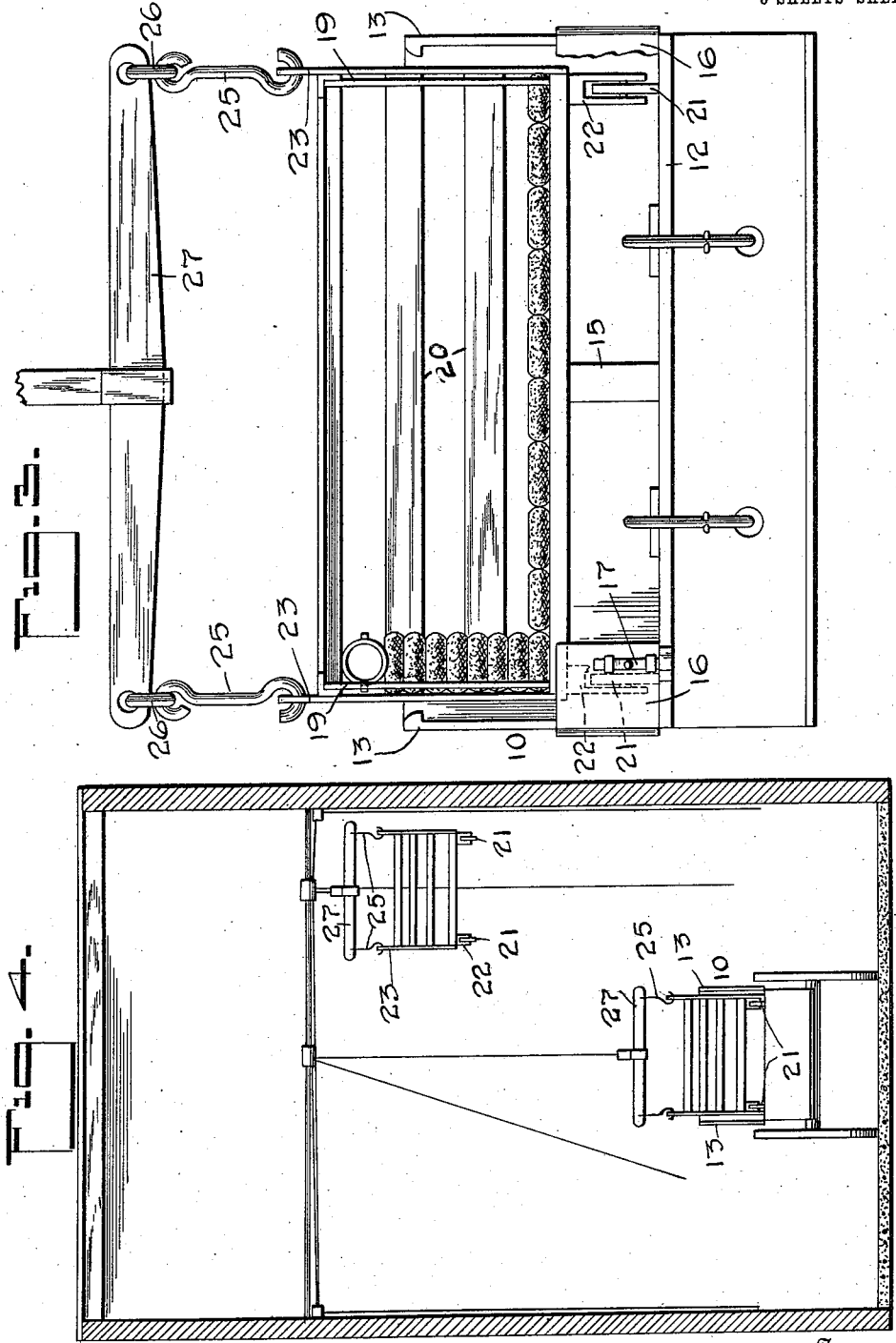

UNITED STATES PATENT OFFICE.

CHARLES J. SCHNEIDER, JOHN SCHNEIDER, JOHN H. LOEFFLER, AND CHARLES FLECK, OF WEST HOBOKEN, NEW JERSEY.

HOSE-CONVEYER.

1,028,612.  Specification of Letters Patent.  Patented June 4, 1912.

Application filed September 21, 1911. Serial No. 650,588.

*To all whom it may concern:*

Be it known that we, CHARLES J. SCHNEIDER, JOHN SCHNEIDER, JOHN H. LOEFFLER, and CHARLES FLECK, all citizens of the United States, and all residing at West Hoboken, in the county of Hudson and State of New Jersey, have invented a new and useful Hose-Conveyer, of which the following is a specification.

Our improvement relates to an improvement in hose conveyers in which the hose conveyer conforms in shape to an outer or wagon body and is contained therein and is removable therefrom, and the objects of our invention are to provide, (1,) a hose conveyer which shall be particularly useful to the fire departments of small cities and towns having limited fire fighting facilities, and where the pressure of water is strong enough to provide an effective stream from a hose attached to a hydrant without the need of pumping fire engines, and which is also useful with the hose wagon or tender of such engines, (2) which shall provide a ready means for conveying hose in a compact and easily transportable form, (3) which, being independent of the hose wagon, allows the hose to be carried bodily, in compact form, to a position at a fire which could not be approached by the hosewagon owing to physical obstacles and the hose uncoiled at such position, (4) which provides a ready means for quickly transporting additional hose to a fire without the necessity for and time lost uncoiling such additional hose in the hose wagon, (5) which provides a ready means for having additional hose at the fire company house for instant transportation to the fire, and (6) which shall provide a means for preserving the hose when it is not in use. We attain these objects by the device illustrated in the accompanying drawings in which—

Figure 1, is a plan view of our hose conveyer in connection with a wagon body. Fig. 2, is a side view of our hose conveyer in connection with a wagon body. Fig. 3, is an end view of our hose conveyer in connection with a wagon body. Fig. 4, is a view of a section of a fire company house showing our hose conveyer in a hose wagon therein and an additional conveyer filled with extra hose slung to the ceiling of the house.

Similar numerals refer to similar parts throughout the several views.

Our hose conveyer is used, when distant and speedy transportation thereof is required, in connection with a wagon or outer body, 10, having a bottom, 12, sides, 13, and a forward end, 14, and open above and at the rear end except for the doors hereinafter mentioned, the wagon or outer body being provided with axles and supported upon wheels of the ordinary types.

Our hose conveyer, which preferably is of iron or steel, in shape conforms to the shape of the outer body, 10, the intention being that it shall fit into the outer body.

Our hose conveyer comprises a top and bottom frame, 18, of angle iron construction, connected and supported at its sides by vertical bars or slats, 19, and connected at its front end by transverse bars or slats, 20, and at its bottom by transverse bars or slats, 28, but open above and at its rear end, the hose conveyer being made frame or lattice to save weight and also to allow circulation of air through it and under and around the hose contained therein, thereby preserving the hose from rotting and lengthening its term of usefulness.

Our hose conveyer is supported by wheels, 21, attached by ear lugs, 22, to the under side of the top and bottom frame, 18, the wheels, 21, resting upon the interior of the bottom of the outer or wagon body and permitting the ready sliding of the conveyer into and out of the outer body, the wheels, 21, and ear lugs, 22, being made of sufficient height to permit the free passage of air under our hose conveyer. But we do not confine ourselves to wheels for this purpose, as any means, such as slide rails, may be used which will permit the desired sliding movement, but such means should be so arranged as to allow the passage of air under the hose conveyer. This raising of the bottom of the hose conveyer above the bottom of the outer or wagon body also allows carrying between the exterior of the bottom of the conveyer, and the interior of the bottom of the outer or wagon body scaling ladders, hooks, axes and other fire fighting appliances, the bulk of which does not interfere with the passage of air under the hose conveyer.

Two bars or slats on each side of top and bottom frame, 18, are extended upward forming standards, 23, inclining toward each other, and provided with eyes, 24, into which removable hooks, 25, are inserted, the hooks, 25, being connected to rings, 26, attached to a bar, 27, as a means with which to lift the conveyer out of the outer body, 10. The standards, 23, are inclined toward each other to afford rigidity to the top and bottom frame, 18, and also to afford a good balance of the conveyer when it is lifted out of the outer body, the intention being to provide a means by which our hose conveyer may be used as an extra hose conveyer in connection with overhead attachments in a fire company house.

The transverse bottom bars or slats, 28, in addition to allowing the passage of air under the hose contained in the conveyer, permit the lowest layer of hose to sag slightly in the spaces between the bars or slats and thus act as stops to prevent the whole body of hose from pulling out in mass instead of uncoiling layer by layer, as might be the case if the body of hose rested on a smooth surface.

The operation of our hose conveyer is as follows:—The hose conveyer, having been placed in the outer body, 10, and prevented from sliding too far forward by suitable means, such as a stop 15, on the bottom of the forward end of the outer body, and retained in the outer body by other suitable means at its rear end, such as part doors, 16, having catches, 17, the hose is laid in the conveyer, in looped layers extending longitudinally of the conveyer and so arranged that it will run out freely when necessary to connect it with a hydrant, our hose conveyer then being in readiness to respond to an alarm of fire. On arriving at the fire, if obstacles prevent the drawing of the hose wagon to a desired position our conveyer may be removed from the wagon and carried to the desired position and the hose uncoiled for use there.

To meet the necessity for extra hose and to provide the same without loss of time a set of two conveyers should be used, the extra conveyer being loaded with hose and swung from the ceiling of the fire company house as shown in Fig. 4. The methods of obtaining the extra hose may be employed; the first, by rushing the hose wagon containing the empty conveyer back to the fire company house and there hoisting out the empty conveyer and lowering the extra conveyer into its place and then taking it to the fire, or while still at the fire the empty conveyer may be drawn forth from the wagon, deposited upon the ground and left there temporarily while the empty and light wagon is hurried back to the fire company house and there receives the extra conveyer and is rushed back to the conflagration.

As each of our hose conveyers is intended to hold about one thousand feet of hose and as a fire company may be provided with several extra conveyers the advantage of this feature of our invention is obvious, whereas by the present method the efforts and time of several men are necessary to fill the ordinary hose wagon with extra hose, which must be placed therein with care to insure its running out properly when taken where needed, and all this at a time when every lost moment is of the utmost value.

Having fully described our invention what we claim and desire to protect by Letters Patent is:—

A hose conveyer comprising a top and bottom frame of angle iron construction, vertical bars or slats connecting and supporting said frame at its sides, transverse bars or slats connecting said frame at the bottom and front end thereof, wheels attached to the under side of said frame for supporting and sliding the conveyer on a horizontal surface and affording space for the passage of air between the exterior of the bottom of the conveyer and said horizontal surface, and upwardly extending standards attached to the sides of said frame to afford rigidity thereto and for attachment to overhead suspension, the conveyer being of wagon body form and said frame, vertical and transverse bars or slats and standards being arranged to permit the circulating of air under and around the hose contained in the conveyer; substantially as set forth.

CHARLES J. SCHNEIDER.
JOHN SCHNEIDER.
JOHN H. LOEFFLER.
CHARLES FLECK.

Witnesses:
W. H. GEE,
CHAS. R. TANSILL.

---

Copies of this patent may be obtained for five cents each, by addressing the "Commissioner of Patents, Washington, D. C."